United States Patent
Lee

(10) Patent No.: US 7,418,059 B2
(45) Date of Patent: Aug. 26, 2008

(54) DIGITAL BROADCAST SIGNAL REPRODUCING SYSTEM AND METHOD

(75) Inventor: Kwang-yong Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 664 days.

(21) Appl. No.: 10/189,395

(22) Filed: Jul. 8, 2002

(65) Prior Publication Data
US 2003/0071926 A1 Apr. 17, 2003

(30) Foreign Application Priority Data
Oct. 9, 2001 (KR) ............... 2001-62206

(51) Int. Cl.
H04L 27/06 (2006.01)
(52) U.S. Cl. .................... 375/316
(58) Field of Classification Search ............. 375/260, 375/316, 324, 340, 344, 259, 322; 348/552, 348/553, 571, 725, 836; 381/2; 455/150.1, 455/154.1, 160.1, 167.1, 186.1; 710/8, 14, 710/19, 22, 38
See application file for complete search history.

(56) References Cited
U.S. PATENT DOCUMENTS

| | | | |
|---|---|---|---|
| 5,274,455 A * | 12/1993 | Nishide et al. ............. 348/775 |
| 5,359,367 A * | 10/1994 | Stockill ..................... 725/137 |
| 5,699,384 A | 12/1997 | Dillion | |
| 5,712,977 A * | 1/1998 | Glad et al. ................... 710/10 |
| 5,748,255 A * | 5/1998 | Johnson et al. ............ 348/553 |
| 6,118,498 A * | 9/2000 | Reitmeier .................. 348/725 |
| 6,175,390 B1 | 1/2001 | Kim et al. | |
| 6,430,743 B1 * | 8/2002 | Matsuura ................... 725/112 |
| 6,483,553 B1 * | 11/2002 | Jung ......................... 348/731 |
| 2001/0019948 A1 | 9/2001 | Obitsu | |

FOREIGN PATENT DOCUMENTS

| | | |
|---|---|---|
| EP | 0 867 812 | 9/1998 |
| JP | 8-237154 | 9/1996 |
| JP | 10-39971 | 2/1998 |
| WO | 00/70868 | 11/2000 |
| WO | 01/06759 | 1/2001 |

* cited by examiner

Primary Examiner—Don N Vo
(74) Attorney, Agent, or Firm—Staas & Halsey LLP

(57) ABSTRACT

A digital broadcast signal reproducing system including a first board having a tuner receiving a digital broadcast signal; a second board removably combined with the first board, the second board having a demodulator demodulating the digital broadcast signal into an analog signal and a memory storing information on a broadcasting mode therein; and a device driver controlling the tuner and the demodulator, and various chip sets according to the information on the broadcasting mode stored in the memory. With this configuration, a digital broadcast signal reproducing system and method thereof are economical for a manufacturer and a consumer because only a part thereof depending upon a broadcasting system is changed.

11 Claims, 4 Drawing Sheets

DIGITAL BROADCAST SIGNAL REPRODUCING SYSTEM AND METHOD

CROSS-REFERENCE TO RELATED APPLICATIONS

This application claims the benefit of Korean Application No. 2001-62206, filed Oct. 9, 2001, in the Korean Intellectual Property Office, the disclosure of which is incorporated herein by reference.

BACKGROUND OF THE INVENTION

1. Field of the Invention

The present invention relates in general to a digital broadcast signal reproducing system and method thereof, and more particularly, to a digital broadcast signal reproducing system having a digital broadcast signal receiving unit and a broadcast signal reproducing method using the system, which can be used regardless of the kinds of a broadcast signal.

2. Description of the Related Art

Generally, a broadcast signal receiving card is employed for reproducing a broadcast signal through a computer system.

Most of the broadcast signal receiving cards have the same configuration regardless of whether the broadcast signal receiving card receives an analog signal or a digital signal. The broadcast signal receiving card is comprised of a tuner for receiving a broadcast signal responding to a selected channel, an IF (Intermediate Frequency) filter converting the broadcast signal selected by the tuner to be within an IF band, a demodulator demodulating the broadcast signal outputted from the IF filter, and a decoder decoding both a video signal and an audio signal from the broadcast signal demodulated by the demodulator.

Further, there are various methods of reproducing the broadcast signal. A PCI (peripheral component interface) method is widely used In the PCI method, the broadcast signal receiving card converts the broadcast signal into a digital signal, and outputs the digital signal to a memory of a graphic card through a PCI bus. Device drivers are provided in the computer system for operating hardware components, and particularly a device driver of the broadcast signal receiving card detects the broadcast signal receiving card for an operating system, and drives the broadcast signal receiving card to output the video and audio signals from the digital signal received through the PCI bus to the graphic card and a sound card, respectively.

Recently, a broadcast signal receiving card, which can be used for a digital broadcast, is being developed in line with a digital broadcasting service. Representative examples of a broadcasting mode for the digital broadcast include, an ATSC (advanced television standard committee) mode, which was chosen in North America, and a DVB (digital video broadcast) mode, which was chosen in Europe. However, the ATSC mode and the DVB mode are different in the IF bands thereof. Further, in the case of the same DVB modes, IF bands are somewhat different.

Therefore, the computer system must have a different broadcast signal receiving card comprising a demodulator and a decoder suitable for the broadcasting mode depending on a locality. That is, the broadcast signal receiving card should be adaptable in response to either the ATSC mode or the DVB mode.

Accordingly, a lot of time and effort is required to develop a demodulator and a decoder, which is suitable for a broadcasting mode. Also to replace the broadcast signal receiving card with a new one whenever the computer system is used in places with a different broadcasting mode is uneconomical.

Consequently, development of a broadcast signal receiving card, which can be used regardless of the broadcasting mode, is needed.

SUMMARY OF THE INVENTION

Accordingly, the present invention provides a digital broadcast signal reproducing system having a digital broadcast signal receiving unit and method thereof, which can be used regardless of a broadcasting mode.

Additional objects and advantages of the invention will be set forth in part in the description which follows and, in part, will be obvious from the description, or may be learned by practice of the invention.

This and other objects of the present invention may be accomplished by a digital broadcast signal reproducing system comprising a first board having a tuner receiving a digital broadcast signal; a second board removably combined with the first board, and having a demodulator demodulating the digital broadcast signal into an analog signal and a memory storing information on a broadcasting mode therein; and a device driver controlling the tuner, the demodulator, and various chip sets according to the information on the broadcasting mode stored in the memory.

Preferably, the device driver has information on an IF band standard according to the broadcasting mode, and sets up a frequency band of a broadcast signal to be tuned by the tuner, a frequency band of the broadcast signal to be demodulated by the demodulator, and frequency bands of video and audio signals decoded by the decoder on the basis of the IF band standard according to the broadcasting mode.

According to another aspect of the present invention, the above and other objects may be achieved by a method of reproducing a digital broadcast signal through a computer, said computer comprising a first board having a tuner receiving the digital broadcast signal within the computer; and a second board having a demodulator demodulating the digital broadcast signal from the tuner into an analog signal and a memory storing information on a broadcasting mode therein to the first board, comprising loading information on a broadcasting mode stored in the memory; and setting up the tuner, the demodulator, and various chip sets according to the information on the broadcasting mode stored in the memory.

Preferably, the setting includes setting up a frequency band of the broadcast signal to be tuned by the tuner; setting up a frequency band of the broadcast signal to be demodulated by the demodulator; and setting up a frequency bands of video and audio signals to be decoded by the decoder.

According to another embodiment of the present invention, the above and other objects may be achieved by a digital broadcast signal receiving device comprising a first board having a tuner receiving a digital broadcast signal, a second board removably combined to the first board and having a demodulator demodulating the digital broadcast signal into an analog signal and a memory storing information on a broadcasting mode therein.

Preferably, the information on the broadcasting mode stored in the memory includes the name of a country transmitting a digital broadcast signal to be demodulated by the demodulator.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
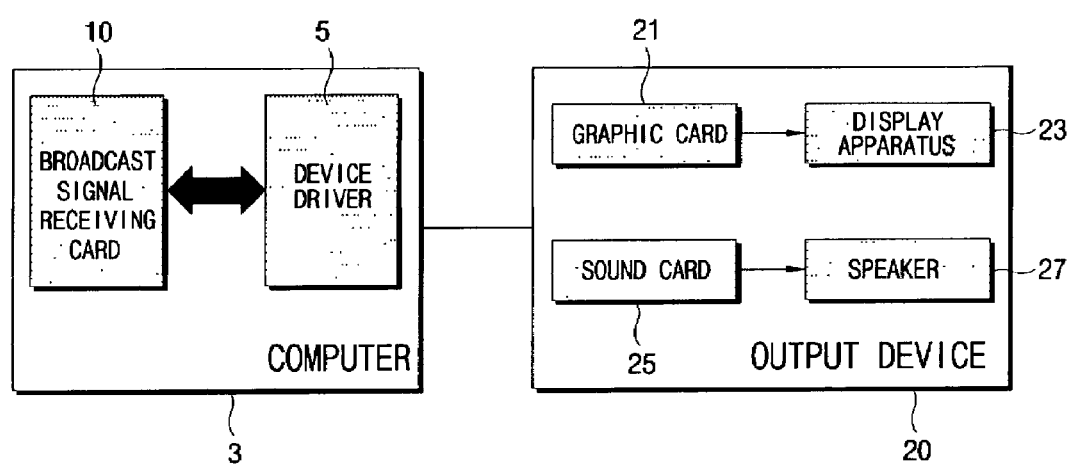
FIG. 1 is a block diagram of a digital broadcast signal processing system according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A digital broadcast signal reproducing system according to an embodiment of the present invention has a broadcast signal receiving card, which can be used regardless of a broadcasting mode.

As shown in FIG. 1, a digital broadcast signal reproducing system comprises a computer 3 processing a digital broadcast signal, and an output device 20 outputting the processed digital signal to the outside.

The computer 3 includes a broadcast signal receiving card 10 receiving the digital broadcast signal, and a device driver 5 controlling the broadcast signal receiving card 10.

Figure 2:
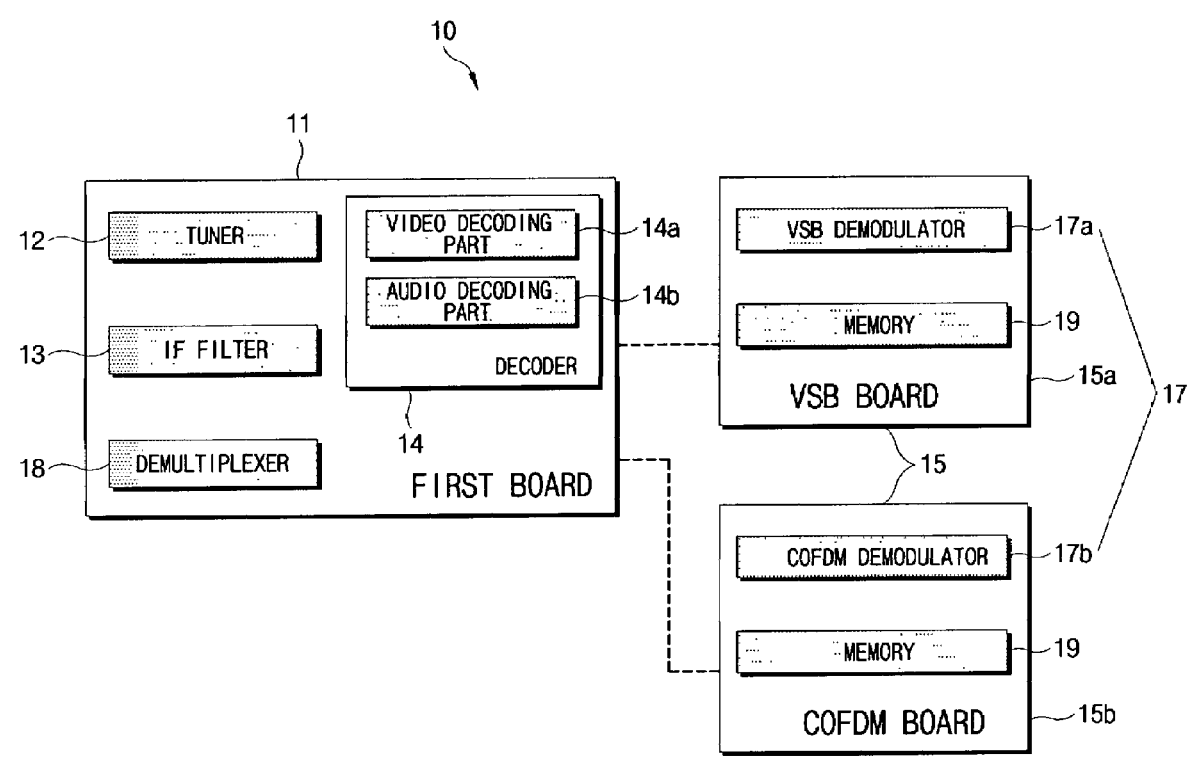
FIG. 2 is a block diagram of a broadcast signal receiving card of FIG. 1.

As shown in FIG. 2, the broadcast signal receiving card 10 is comprised of a first board 11, and a second board 15 removably combined with the first board 11 and having a demodulator 17.

On the first board 11 are provided a tuner 12 receiving a broadcast signal responding to a selected channel, an IF filter 13 converting the broadcast signal selected by the tuner 12 to be within an IF band, a demultiplexer 18 dividing an analog broadcast signal demodulated by a demodulator 17 into a video signal and an audio signal, and a decoder 14 decoding the video signal and the audio signal. Herein, the decoder 14 has a video decoding part 14a for decoding a video signal compressed by a compression standard like an MPEG-2 (moving picture experts group 2), and an audio decoding part 14b decoding an audio signal compressed by a compression standard like an AC-3 (Digital Audio AC-3).

On the second board 15 are provided the demodulator 17 demodulating a digital broadcast signal outputted from the tuner 12 into an analog signal, and a memory 19 storing information on the broadcasting mode. The memory 19 is comprised of an EEPROM (electrically erasable read-only memory).

Specifically, on the second board 15 is provided either a VSB (vestigial side band) board 15a having a VSB demodulator 17a demodulating a broadcast signal of an ATSC mode, or a COFDM board 15b for a COFDM demodulator 17b demodulating a broadcast signal of a DVB mode. In the memory 19 for the VSB board 15a is stored information on the VSB demodulator 17a demodulating a broadcast signal of the ATSC mode used in North America, and in the memory 19 for the COFDM board 15b is stored information on the COFDM demodulator 17b demodulating a broadcast signal of the DVB mode used in Europe. Therefore, to the first board 11 is selectively combined the VSB board 15a for the ATSC mode used in North America, or the COFDM board 15b for the DVB mode used in Europe.

Figure 3:
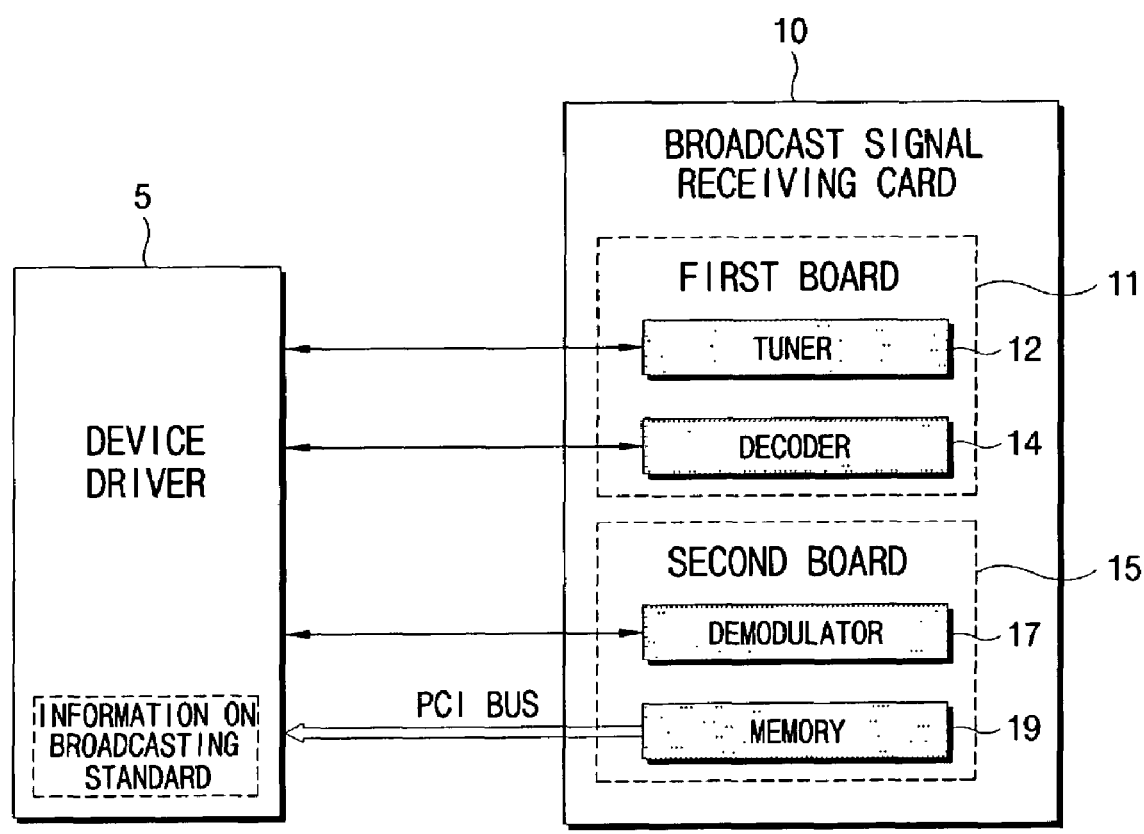
FIG. 3 is a control block diagram of the broadcast signal receiving card of FIG. 2.

As shown in FIG. 3, to control the broadcast signal receiving card 10, the device driver 5 communicates with the broadcast signal receiving card 10 through a PCI bus. Under an operating system, the device driver 5 detects the broadcasting mode stored in the memory 19, and then determines which board, the VSB board 15a (shown in FIG. 2) or the COFDM board 15b (shown in FIG. 2), is employed as the second board 15 of the broadcast signal receiving card 10. Further, the device driver 5 controls the tuner 12, the demodulator 17 and the decoder 14 on the basis of the second board 15 according to the broadcasting mode.

Therefore, the device driver 5 has information on an IF band standard of the video and audio signals according to the broadcasting mode, as in the following <Table 1>.

TABLE 1

| Broadcasting mode | Video signal IF band | Audio signal IF band |
|---|---|---|
| ATSC mode | 38.90 MHz | 5.5 MHz |
| DVB mode | 45.75 MHz | 4.5 MHz |
| . | . | . |
| . | . | . |

Thus, the device driver 5 loads the IF band standard according to a broadcasting mode stored in the memory 19, sets up a frequency band of a broadcast signal to be tuned by the tuner 12, and sets up a frequency band of the broadcast signal to be demodulated by the demodulator 17. According to the change in the frequency band of a broadcast signal to be demodulated by the demodulator 17, the IF bands of the video and audio signals, which are divided by the demultiplexer 18, are changed, so that the device driver 5 changes a frequency band of the decoder 14 corresponding to the IF bands of the video and audio signals.

Referring to FIGS. 1-3, the output device 20 includes a display apparatus 23 outputting the video signal, and a speaker 27 outputting the audio signal. To output the video and audio signals, the computer 3 has a graphic card 21 outputting the video signal decoded by the video decoding part 14a to the display apparatus 23, and a sound card 25 outputting the audio signal decoded by the audio decoding part 14b to the speaker 27.

Figure 4:
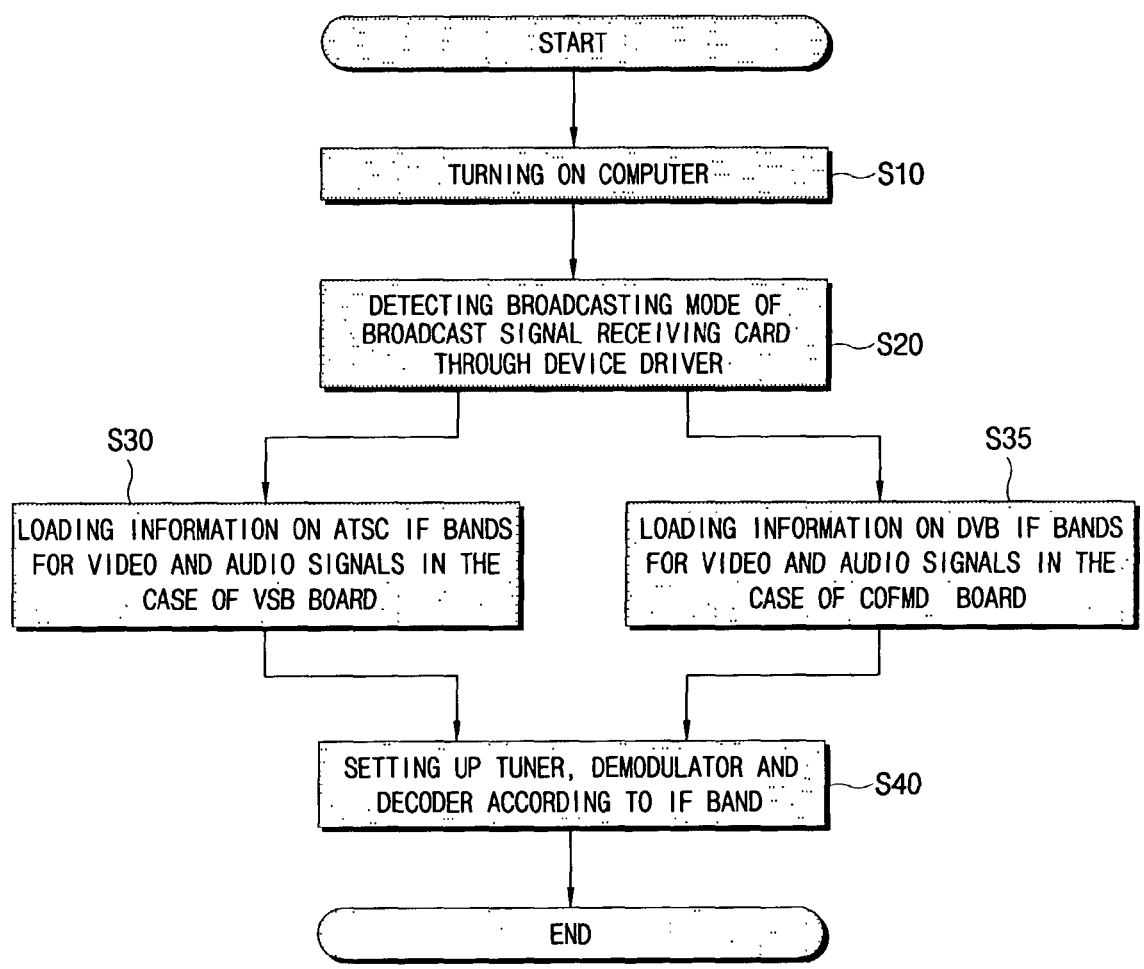
FIG. 4 is a flow chart showing an operation of a digital broadcast signal processing system having the broadcast signal receiving card of FIG. 2.

Next, the process of reproducing the digital broadcast signal through a digital broadcast reproducing system will be described, referring to FIG. 4.

First, electric power is supplied to the computer 3 (S10), and the device driver 5 loads the information stored in the memory 19 of the broadcast signal receiving card 10 through the PCI bus and determines a broadcasting mode of the broadcast signal receiving card 10, under the operating system (S20). In other words, the broadcast signal receiving card 10 determines which board, either the VSB board 15a or the COFDM board 15b is employed as the second board 15 of the broadcast signal receiving card 10.

If the VSB board 15a is employed as the second board 15, the device driver 5 sets up the frequency bands of the demodulator 17 and the decoder 14 corresponding to the video IF band of 38.9 MHz and the audio IF band of 5.5 MHz shown in the ATSC mode of <Table 1>, respectively (S30). Then, the device driver 5 sets up the tuner 12 so as to tune channels suitable for the IF band standard (S40).

If the COFDM board 15b is employed as the second board 15, the device driver 5 sets up the frequency bands of the demodulator 17 and the decoder 14 corresponding to the video IF band of 45.75 MHz and the audio IF band of 4.5 MHz shown in the DVB mode of <Table 1>, respectively (S35). Then, the device driver 5 sets up the tuner 12 so as to tune channels suitable for the IF band standard (S40).

After the setting is completed, the digital broadcast signal receiving card 10 processes a broadcast signal according to the broadcasting mode. That is, if the broadcast signal receiving card 10 receives a broadcast signal, then the tuner 12 tunes a frequency band corresponding to the channel selected by a user, and the IF filter 13 converts the broadcast signal tuned by the tuner 12 to be within the IF band. Thereafter, the demodulator 17 demodulates the broadcast signal within the IF band, and the demultiplexer 18 divides the demodulated broadcast signal into the video signal and the audio signal. The video and audio signals are decoded by the video and audio decoding parts 14*a* and 14*b*, respectively. The decoded video signal is displayed on the display apparatus 23 through the graphic card 21. The decoded audio signal is outputted to the speaker 27 through the sound card 25.

As described above, in the digital broadcast signal reproducing system according to an embodiment of the present invention, the broadcast signal receiving card 10 comprises the first board 11 having the tuner 12 and the decoder 14, and the second board 15 having the demodulator 17 and the memory 19. At this time, the second board is manufactured according to the ATSC broadcasting mode for the VSB demodulator and the DVB broadcasting mode for the COFDM demodulator, respectively. Therefore, contrary to the conventional broadcast signal receiving card, without replacing the broadcast signal receiving card 10 with a new one, the first board 11 thereof is commonly used and only the second board 15 thereof is changed when the broadcasting mode is changed. Consequently, the manufacturing cost and efforts thereof are required only when the second board 15 is changed.

As described above, the present invention provides a digital broadcast signal reproducing system and method, which is economical for both a manufacturer and a consumer because only a part thereof depending upon a broadcasting system is changed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital broadcast signal reproducing system comprising:
   a first board having a tuner receiving a digital broadcast signal;
   a second board removably combined with the first board, and having a demodulator demodulating the digital broadcast signal into an analog signal and a memory storing information on a broadcasting mode of the digital broadcast signal therein; and
   a device driver controlling the tuner and the demodulator according to the information on the broadcasting mode stored in the memory by loading an IF band standard stored therein according to a broadcasting mode specified by the information on the broadcasting mode received by the device driver,
   wherein the device driver has information on the IF band standard according to the broadcasting mode for at least an Advanced Television Standard Committee (ATSC) mode and a Digital Video Broadcast (DVB) mode.

2. The digital broadcast signal reproducing system according to claim 1, wherein the device driver sets up a frequency band of the digital broadcast signal to be tuned by the tuner, a frequency band of the digital broadcast signal to be demodulated by the demodulator, and frequency bands of video and audio signals, respectively, decoded by the decoder based on the IF band standard according to the broadcasting mode.

3. A method of reproducing a digital broadcast signal through a computer, said computer comprising a first board having a tuner to receive the digital broadcast signal a second board having a demodulator to demodulate the digital broadcast signal from the tuner into an analog signal and a memory to store information on a broadcasting mode of the digital broadcast signal therein for the first board, the method comprising:
   loading the information on the broadcasting mode stored in the memory; and
   setting up the tuner, and the demodulator according to the information on the broadcasting mode stored in the memory by loading an IF band standard stored in a memory of a device driver according to a broadcasting mode specified by information on the broadcasting mode received by the device driver,
   wherein the device driver has information on the IF band standard according to the broadcasting mode for at least an Advanced Television Standard Committee (ATSC) mode and a Digital Video Broadcast (DVB) mode.

4. The method according to claim 3, wherein the setting includes:
   setting up a frequency band of the digital broadcast signal to be tuned by the tuner;
   setting up a frequency band of the digital broadcast signal to be demodulated by the demodulator; and
   setting up frequency bands of video signals and audio signals to be decoded by the decoder.

5. A digital broadcast signal reproducing system comprising:
   a tuner receiving a digital broadcast signal;
   a demodulator demodulating the digital broadcast signal from the tuner into an analog signal;
   a memory storing information on a broadcasting mode of the digital broadcast signal therein; and
   a device driver controlling the tuner and the demodulator according to the information on the broadcasting mode of the digital broadcast signal stored in the memory by loading an IF band standard stored therein according to a broadcasting mode specified by the information on the broadcasting mode received by the device driver,
   wherein said demodulator and said memory reside together on a first board or a second board, the first board and second board forming a unit in which said first board and said second board are disconnectable from each other such that a change of the broadcasting mode of the digital broadcast signal reproducing system results from changing one of said first board or said second board, and
   wherein the device driver has information on the IF band standard according to the broadcasting mode for at least an Advanced Television Standard Committee (ATSC) mode and a Digital Video Broadcast (DVB) mode.

6. The digital broadcast signal receiving device according to claim 5, wherein the information on the broadcasting mode stored in the memory includes a name of a country transmitting a digital broadcast signal to be demodulated by the demodulator.

7. The digital broadcast signal reproducing system according to claim 5, wherein the device driver has information on an IF band standard according to the broadcasting mode, and sets up a frequency band of a broadcast signal to be tuned by the tuner, a frequency band of the broadcast signal to be demodulated by the demodulator, and frequency bands of video and audio signals, respectively, decoded by the decoder based on of the IF band standard according to the broadcasting mode.

8. A method of reproducing a digital broadcast signal through a computer, the method comprising:
   receiving the digital broadcast signal with a tuner;
   demodulating the digital broadcast signal from the tuner into an analog signal with a demodulator;
   storing information on a broadcasting mode of the digital broadcast signal in a memory; and
   controlling the tuner and the demodulator according to the information on the broadcasting mode stored in the memory by loading an IF band standard stored in a memory of a device driver according to a broadcasting mode specified by the information on the broadcasting mode received by the device driver,
   wherein said demodulator is provided on a removable board on which said memory resides, and
   wherein the device driver has information on the IF band standard according to the broadcasting mode for at least an Advanced Television Standard Committee (ATSC) mode and a Digital Video Broadcast (DVB) mode.

9. The method according to claim 8, further comprising:
   changing the broadcasting mode by replacing the removable board.

10. The method according to claim 8, further comprising:
    storing in the memory a name of a country transmitting the digital broadcast signal to be demodulated by the demodulator.

11. The storage medium according to claim 8, wherein the setting includes:
    setting up a frequency band of the digital broadcast signal to be tuned by the tuner;
    setting up frequency band of the digital broadcast signal to be demodulated by the demodulator; and
    setting up frequency bands of video and audio signals to be decoded by a decoder.

* * * * *